(12) United States Patent
Nakayama et al.

(10) Patent No.: US 8,193,265 B2
(45) Date of Patent: Jun. 5, 2012

(54) RUBBER COMPOSITION AND TIRES MADE BY USING THE SAME

(75) Inventors: Atsushi Nakayama, Tokyo (JP); Daisuke Nohara, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 833 days.

(21) Appl. No.: 10/516,463

(22) PCT Filed: Jun. 9, 2003

(86) PCT No.: PCT/JP03/07265
§ 371 (c)(1), (2), (4) Date: Apr. 21, 2005

(87) PCT Pub. No.: WO04/000930
PCT Pub. Date: Dec. 31, 2003

(65) Prior Publication Data
US 2005/0176861 A1  Aug. 11, 2005

(30) Foreign Application Priority Data
Jun. 20, 2002  (JP) ................................. 2002-180408

(51) Int. Cl.
*C08K 5/5419* (2006.01)
*C08K 3/36* (2006.01)
*B60C 1/00* (2006.01)

(52) U.S. Cl. ......... 524/262; 524/492; 524/571; 152/905

(58) Field of Classification Search .................. 524/262, 524/492; 152/905
See application file for complete search history.

(56) References Cited

U.S. PATENT DOCUMENTS

| 4,709,065 A | 11/1987 | Yoshioka et al. |
| 5,663,226 A | 9/1997 | Scholl et al. |
| 2002/0147358 A1 | 10/2002 | Yanagisawa et al. |
| 2006/0094892 A1 | 5/2006 | Yanagisawa et al. |

FOREIGN PATENT DOCUMENTS

| JP | 62067092 A | * | 3/1987 |
| JP | 07258474 A | * | 10/1995 |
| JP | 09-003248 A | | 1/1997 |
| JP | 09-012922 A | | 1/1997 |
| JP | 2002308887 A | * | 10/2002 |
| JP | 2004-018511 A | | 1/2004 |

* cited by examiner

*Primary Examiner* — Vickey Nerangis
(74) *Attorney, Agent, or Firm* — Sughrue Mion, PLLC

(57) ABSTRACT

The rubber composition of the present invention is prepared by mixing 10 to 200 parts by mass of silica and 1 to 30 parts by mass of a silane compound having sulfur atom, which has a specific structure such that an organooxysilyl group is present at both ends of the molecule and sulfide or a polysulfide is present at the central portion of the molecule, with 100 parts by mass of a polymer. The rubber composition of the present invention has a small viscosity in the unvulcanized condition and provides excellent dispersion of silica. When this composition is used as a material for a tire tread, a tire exhibiting excellent abrasion resistance, a small rolling resistance and excellent braking property and steering stability on wet roads, can be obtained.

21 Claims, No Drawings

RUBBER COMPOSITION AND TIRES MADE BY USING THE SAME

TECHNICAL FIELD

The present invention relates to a rubber composition comprising a silane compound having sulfur atom and a specific structure, more particularly, to a rubber composition exhibiting excellent abrasion resistance, a small rolling resistance and excellent braking property and steering stability on wet roads when the rubber composition is used as a tire tread, and to a tire using the rubber composition.

BACKGROUND ART

Among various fillers used for rubber compositions, silica has drawbacks in processability although silica provides a small rolling resistance and excellent braking property and steering stability on wet roads. For example, it is necessary that a multi-stage mixing be conducted due to a great viscosity in the uncured condition. Silica has other drawbacks in that dispersion of the filler is poor, vulcanization is delayed, and strength at break and abrasion resistance are markedly decreased (for example, Japanese Patent Application Laid-Open No. Heisei 8(1996)-176345).

When silica is mixed with rubber, it is widely conducted to overcome the problems that a coupling agent is added so that the viscosity in the uncured condition is decreased and the modulus and the abrasion resistance are improved. However, this process has a problem in that the coupling agent is expensive, and the cost of production increases depending on the formulation.

It is also conducted that an additive for improving dispersion is used to improve the processability by decreasing the viscosity in the uncured condition through improvement in the dispersion of silica. However, this process has a drawback in that abrasion resistance decreases. When a strongly ionic compound is used as the agent for improving dispersion, processability such as adhesion to rolls occasionally decreased.

DISCLOSURE OF THE INVENTION

The present invention has an object of providing a rubber composition which has a small viscosity in the unvulcanized condition, provides excellent dispersion of silica and exhibits excellent abrasion resistance, a small rolling resistance and excellent braking property and steering stability on wet roads when the rubber composition is used as a material for a tire tread and a tire using the rubber composition.

As the result of extensive studies by the present inventors to overcome the above problems, it was found that the above object could be achieved by the rubber composition and the tire described in the following. The present invention has been completed based on this knowledge. Thus, the present invention provides:

(1) A rubber composition which comprises, per 100 parts by mass of a polymer, 10 to 200 parts by mass of silica and 1 to 30 parts by mass of a silane compound having sulfur atom represented by average structural formula (I):

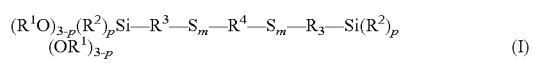
(I)

wherein $R^1$ and $R^2$ each represent a hydrocarbon group having 1 to 4 carbon atoms, $R^3$ represents a divalent hydrocarbon group having 1 to 15 carbon atoms, p represents an integer of 0 to 2, m represents a number of 1 or greater and smaller than 4, which may be an average of numbers, and $R^4$ represents a divalent functional group represented by one of following general formulae (II) to (IV):

  (II)

  (III)

  (IV)

wherein $R^5$ to $R^{10}$ represents a linear or branched divalent hydrocarbon group having 1 to 20 carbon atoms, a divalent aromatic group or a divalent organic group having a hetero atom which is not sulfur atom or oxygen atom, $R^5$ to $R^{10}$ may represent a same group or different groups, and x, y and z each represent a number of 1 or greater and smaller than 4, which may be an average of numbers;

(2) A rubber composition described in (1), wherein a purity of the silane compound having sulfur atom is 60% or greater at a time when the silane compound having sulfur atom is mixed to form the rubber composition;

(3) A rubber composition described in any one of (1) and (2), wherein, at a time when the silane compound having sulfur atom is mixed to form the rubber composition, a content of silane compounds having sulfur atom and three or more silicon atoms in one molecule is 30% by mass or smaller of the rubber composition;

(4) A rubber composition described in any one of (1) to (3), wherein a BET surface area of the silica is 40 to 350 m²/g;

(5) A rubber composition described in any one of (1) to (4), wherein the polymer is a diene-based rubber;

(6) A tire which comprises a member comprising a rubber composition described in any one of (1) to (5); and (7) A tire described in (6), wherein the member is a tire tread.

THE MOST PREFERRED EMBODIMENT TO CARRY OUT THE INVENTION

A rubber composition which comprises, per 100 parts by mass of a polymer, 10 to 200 parts by mass of silica and 1 to 30 parts by mass of a silane compound having sulfur atom represented by average structural formula (I):

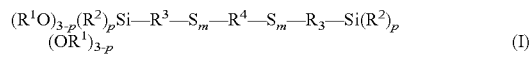
(I)

In above average structural formula (I), $R^1$ and $R^2$ each represent a hydrocarbon group having 1 to 4 carbon atoms, $R^3$ represents a divalent hydrocarbon group having 1 to 15 carbon atoms, p represents an integer of 0 to 2, m represents a number of 1 or greater and smaller than 4, which may be an average of numbers, and $R^4$ represents a divalent functional group represented by one of following general formulae (II) to (IV):

  (II)

  (III)

  (IV)

In above general formulae (II) to (IV), $R^5$ to $R^{10}$ represents a linear or branched divalent hydrocarbon group having 1 to 20 carbon atoms, a divalent aromatic group or a divalent organic group having a hetero atom which is not sulfur atom or oxygen atom, $R^5$ to $R^{10}$ may represent the same group or different groups, and x, y and z each represent a number of 1 or greater and smaller than 4, which may be an average of numbers.

The silane compound having sulfur atom which is used in the present invention is a compound represented by average structural formula (I) and has organooxysilyl groups at both ends of the molecule and sulfide or a polysulfide at the central portion of the molecule.

In the structural formula, $R^1$ and $R^2$ each represent a hydrocarbon group having 1 to 4 carbon atoms such as methyl group, ethyl group, n-propyl group, i-propyl group, n-butyl group, i-butyl group, t-butyl group, vinyl group, allyl group and isopropenyl group. $R^1$ and $R^2$ may represent the same group or different groups. $R^3$ represents a divalent hydrocarbon group having 1 to 15 carbon atoms such as methylene group, ethylene group, propylene group, n-butylene group, i-butylene group, hexylene group, decylene group, phenylene group and methylphenylethylene group. p represents an integer of 0 to 2, and m represents a number of 1 or greater and smaller than 4, which may be an average of numbers. As for the numbers giving the average represented by m, it is sufficient that the average represented by m is within this range. The silane compound may be a mixture of a plurality of silane compounds having sulfur atom in which the number as the basis for the average represented by m is different among the compounds. From the standpoint of the effect of the present invention which will be described below, it is preferable that m represents a number of 1 or greater and smaller than 2. It is more preferable that m represents 1.

$R^4$ in structural formula (I) represents a divalent functional group represented by any one of the above general formulae (II) to (IV). From the standpoint of the effect of the present invention which will be described below, it is preferable that $R^4$ represents a divalent functional group represented by general formula (IV).

$R^5$ to $R^{10}$ represents a linear or branched divalent hydrocarbon group having 1 to 20 carbon atoms, a divalent aromatic group or a divalent organic group having a hetero atom which is not sulfur atom or oxygen atom. Examples of the group represented by $R^5$ to $R^{10}$ include methylene group, ethylene group, propylene group, n-butylene group, i-butylene group, hexylene group, decylene group, phenylene group, methylphenylethylene group and groups derived from these groups by introducing a hetero atom which is not sulfur atom or oxygen atom such as nitrogen atom and phosphorus atom into these groups. In any one of general formulae (II) to (IV) representing the functional group represented by $R^4$ in structural formula (I), $R^5$ to $R^{10}$ may represent the same group or different groups. From the standpoint of the effect of the present invention which will be described below and the cost of production, it is preferable that $R^5$ to $R^{10}$ each represent hexylene group.

It is essential that the group represented by $R^4$ has sulfur atom. x, y and z each represent a number of 1 or greater and smaller than 4, which may be an average of numbers. From the standpoint of the effect of the present invention which will be described below, it is preferable that x, y and z each represent a number of 2 or greater and smaller than 4 and more preferably 2 or greater and 3 or smaller, which may be an average of numbers.

From the standpoint of the effect of the present invention, it is preferable that the purity of the silane compound having sulfur atom is 60% or greater, more preferably 70% or greater and most preferably 80% or greater at the time when the silane compound having sulfur atom is mixed to form the rubber composition.

The silane compound having sulfur atom which is used in the present invention occasionally contains polymers such as a dimer and a trimer of the compound represented by structural formula (I) which are produced during the production. Silane compounds having sulfur atom and three or more silicon atoms in one molecule such as the polymers described above occasionally adversely affect the effect of the present invention. In the present invention, it is preferable that, when the silane compound having sulfur atom is mixed to form the rubber composition of the present invention, the content of the silane compound having sulfur atom and three or more silicon atoms in one molecule is 30% by mass or smaller, more preferably 10% by mass or smaller and most preferably substantially zero percent of the rubber composition at the time.

In the present invention, the silane compound having sulfur atom is mixed in an amount of 1 to 30 parts by mass per 100 parts by mass of a polymer. From the standpoint of the effect of the present invention which will be described below, it is preferable that the silane compound having sulfur atom is mixed in an amount of 2 to 20 parts by mass.

The polymer used in the present invention is not particularly limited as long as the rubber composition can be formed. It is preferable that the polymer is a diene-based rubber. Specifically, natural rubber and various types of diene-based synthetic rubbers can be used. The diene-based synthetic rubbers are more preferable. Examples of the diene-based synthetic rubber include butadiene-based polymers such as polybutadiene (BR), copolymers of butadiene and aromatic vinyl compounds and copolymers of butadiene and other diene-based monomers; isoprene-based polymers such as polyisoprene (IR), copolymers of isoprene and aromatic vinyl compounds and copolymers of isoprene and other diene-based monomers; butyl rubber (IIR); ethylene-propylene copolymers; and mixtures of these rubbers. Among these rubbers, butadiene-based polymers and isoprene-based polymers are preferable and styrene-butadiene copolymers (SBR) are more preferable.

The microstructure of SBR is not particularly limited. It is preferable that the content of the bound styrene unit is in the range of 5 to 60% by mass and more preferably in the range of 15 to 45% by mass.

In the present invention, it is preferable that the styrene-butadiene copolymer is comprised in an amount of 50% by mass or greater in the rubber component. It is more preferable that the entire rubber component is composed of the styrene-butadiene copolymer (SBR) alone.

Examples of the diene-based monomer include 1,3-butadiene, isoprene, 1,3-pentadiene, 2,3-dimethylbutadiene and 2-phenyl-1,3-butadiene. The diene-based monomer may be used singly, as a mixture of two or more or by copolymerization with other dienes such as 1,3-hexadiene. Among these diene-based monomers, 1,3-butadiene is preferable.

The rubber composition of the present invention comprises 10 to 200 parts by mass of silica per 100 parts by mass of the polymer. The silica is not particularly limited. Examples of the silica include wet silica (hydrous silica), dry silica (silicic acid anhydride), calcium silicate and aluminum silicate. Among these compounds, wet silica is preferable since the effect of improving the properties at break and the simultaneous improvements in the wet gripping property and the low rolling resistance are remarkably exhibited. It is preferable that the BET surface area is in the range of 40 to 350 mm$^2$/g. When the BET surface area is in the above range, the advantage is exhibited in that the property of reinforcing the rubber and the dispersion in the rubber are simultaneously improved. From this standpoint, it is more preferable that the BET surface area is in the range of 8 to 300 mm$^2$/g.

Additives which are conventionally mixed into rubber compositions can be added as long as the effect of the present invention is not adversely affected. Examples of the additive include carbon black, anti-aging agents, zinc oxide, stearic acid, antioxidants and antiozonants which are ordinarily used in the rubber industry.

The rubber composition of the present invention can be obtained by mixing the components using an open mixer such as rolls or a closed mixer such as a Banbury mixer. The rubber composition can be applied to various rubber products after being formed and vulcanized. Examples of the application include members of tires such as tire treads, under treads, carcasses, side walls and beads and industrial products such as vibration isolation rubbers, dock fenders, belts and hoses. The rubber composition is advantageously used as the rubber for tire treads.

The tire of the present invention using the above rubber composition exhibits excellent properties such as excellent abrasion resistance, a small rolling resistance and excellent braking property and steering stability on wet roads. As the gas used for inflating the tire, an inert gas such as the air and nitrogen can be used.

The present invention will be described more specifically with reference to examples in the following. However, the present invention is not limited to the examples.

The evaluations of the properties were conducted in accordance with the following methods.

1. Mooney Viscosity ($ML_{1+4}$)

The Mooney Viscosity ($ML_{1+4}$/130° C.) was measured at 130° C. in accordance with the method of Japanese Industrial Standard K6300-1994, and the obtained value is expressed as an index based on the value obtained in Comparative Example 2, which is set at 100. The smaller the expressed value of the Mooney viscosity, the better the processability.

2. Mooney Scorch Time

The Mooney scorch time was measured for evaluation of the stability in processing a rubber composition. The viscosity of an unvulcanized rubber composition containing components of the vulcanization system was measured at 130° C. in accordance with the method of Japanese Industrial Standard K6300-1994 using the same apparatus as that used for the measurement of the Mooney viscosity. The time from the start of pre-heating to the time when the viscosity increased by 5 units from the minimum value of Vm was measured. The obtained Mooney scorch time is expressed as an index based on the value obtained in Comparative Example 2, which is set at 100. The greater the expressed value of the Mooney scorch time, the better the stability in processing.

3. Hardness

The hardness was measured in accordance with the method of Japanese Industrial Standard K 6253-1997, and the obtained value is expressed as an index based on the value obtained in Comparative Example 2, which is set at 100.

4. Properties at Break

The elongation at break (Eb), the strength at break (Tb) and the tensile stress at the elongation of 300% ($M_{300}$) were measured in accordance with the method of Japanese Industrial Standard K 6251-1993, and the obtained values are expressed as indices based on the values obtained in Comparative Example 2, which are each set at 100.

5. Resilience

The resilience was measured in accordance with the method of Japanese Industrial Standard K 6255-1996 using a Dunlop tripsometer, and the obtained value is expressed as an index based on the value obtained in Comparative Example 2, which is set at 100.

6. Abrasion Resistance (Rubber Composition)

The amount of abrasion at a slip ratio of 60% was measured at the room temperature using a Lambourn abrasion tester. The reverse of the obtained amount of abrasion is expressed as an index based on the reverse of the amount of abrasion obtained in Comparative Example 2, which is set at 100.

7. Rolling Resistance The rolling resistance of a tire was evaluated by the measurement in accordance with the method of coasting after the tire was rotated at a speed of 80 km/h under a load of 460 kg using a rotating drum having a flat surface of steel, an outer diameter of 1707.6 mm and a width of 350 mm. The obtained value is expressed as an index based on the value obtained in Comparative Example 5, which is set at 100. The greater the expressed value, the better (smaller) the rolling resistance.

8. Abrasion Resistance (Tire)

A tire was mounted to a vehicle, and the vehicle was driven for 20,000 km on paved roads. The depth of grooves remaining after the driving was measured, and the distance driven for abrasion of 1 mm of the tread was obtained as a relative value. The obtained value is expressed as an index based on the value obtained in Comparative Example 5, which is set at 100. The greater the expressed value, the better the abrasion resistance.

SYNTHESIS EXAMPLE 1

Into a 0.5 liter separable flask equipped with an inlet for nitrogen gas, a thermometer, a Dimroth condenser and a dropping funnel, 80 g of ethanol, 5.46 g (0.07 moles) of anhydrous sodium sulfide and 2.24 g (0.07 moles) of sulfur were placed, and the temperature of the resultant solution was elevated to 80° C. While the solution was stirred, 33.7 g (0.14 moles) of chloropropyltriethoxysilane (($CH_3CH_2O)_3Si$—$(CH_2)_3$—Cl) and 10.8 g (0.07 moles) of 1,6-dichlorohexane ($ClCH_2$—$(CH_2)_4$—$CH_2Cl$) were slowly added dropwise. After the addition was completed, the stirring was continued at 80° C. for 10 hours. After the stirring was completed and the solution was cooled, the formed salt was removed by filtration, and ethanol used as the solvent was removed by distillation under a reduced pressured.

The obtained product was analyzed in accordance with the infrared spectroscopy (IR analysis), the $^1$H-nuclear magnetic resonance spectroscopy ($^1$H-NMR analysis) and the supercritical chromatography, and it was confirmed that the product was a compound expressed by an average structural formula ($CH_3CH_2O)_3Si$—$(CH_2)_3$—S—S—$(CH_2)_6$—S—S—$(CH_2)_3$—$Si(OCH_2CH_3)_3$. This compound is the compound expressed by average structural formula (I) in which $R^1$ represents ethyl group, $R^3$ represents n-propyl group, $R^4$ represents S—$(CH_2)_6$—S (which is the group represented by general formula (II) in which $R^5$ represents $(CH_2)_6$), p represents 0, and m represents 1. The purity of the compound obtained in accordance with the gel permeation chromatography (GPC analysis) was 82.5%.

SYNTHESIS EXAMPLE 2

The synthesis was conducted in accordance with the same procedures as those conducted in Synthesis Example 1 except that 14.77 g (0.07 moles) of 1,10-dichlorodecane ($ClCH_2$—$(CH_2)_8$—$CH_2Cl$) was used in place of 1,6-dichlorohexane used in Synthesis Example 1.

The obtained solution was analyzed in accordance with the IR analysis, the $^1$H-NMR analysis and the supercritical chromatography, and it was confirmed that the product was a compound expressed by an average structural formula ($CH_3CH_2O)_3Si$—$(CH_2)_3$—S—S—$(CH_2)_{10}$—S—S—$(CH_2)_3$—$Si(OCH_2CH_3)_3$. This compound is the compound expressed by average structural formula (I) in which $R^1$ represents ethyl group, $R^3$ represents n-propyl group, $R^4$ represents S—$(CH_2)_{10}$—S (which is the group represented by general formula (II) in which $R^5$ represents $(CH_2)_{10}$), p represents 0, and m represents 1. The purity of the compound obtained in accordance with the GPC analysis was 84.2%.

SYNTHESIS EXAMPLE 3

The synthesis was conducted in accordance with the same procedures as those conducted in Synthesis Example 1 except that the amount of sulfur was changed to 4.48 g (0.14 moles).

The obtained product was analyzed in accordance with the IR analysis, the $^1$H-NMR analysis and the supercritical chromatography, and it was confirmed that the product was a compound expressed by an average structural formula $(CH_3CH_2O)_3Si$—$(CH_2)_3$—$S_2$—S—$(CH_2)_6$—S—$S_2$—$(CH_2)_3$—$Si(OCH_2CH_3)_3$. This compound is the compound expressed by average structural formula (I) in which $R^1$ represents ethyl group, $R^3$ represents n-propyl group, $R^4$ represents S—$(CH_2)_6$—S (which is the group represented by general formula (II) in which $R^5$ represents $(CH_2)_6$), p represents 0, and m represents 2. The purity of the compound obtained in accordance with the GPC analysis was 81.0%.

SYNTHESIS EXAMPLE 4

The synthesis was conducted in accordance with the same procedures as those conducted in Synthesis Example 1 except that the amount of sulfur was changed to 6.72 g (0.21 moles).

The obtained product was analyzed in accordance with the IR analysis, the $^1$H-NMR analysis and the supercritical chromatography, and it was confirmed that the product was a compound expressed by an average structural formula $(CH_3CH_2O)_3Si$—$(CH_2)_3$—$S_3$—S—$(CH_2)_6$—S—$S_3$—$(CH_2)_3$—$Si(OCH_2CH_3)_3$. This compound is the compound expressed by average structural formula (I) in which $R^1$ represents ethyl group, $R^3$ represents n-propyl group, $R^4$ represents S—$(CH_2)_6$—S (which is the group represented by general formula (II) in which $R^5$ represents $(CH_2)_6$), p represents 0, and m represents 3. The purity of the compound obtained in accordance with the GPC analysis was 80.5%.

SYNTHESIS EXAMPLE 5

Into a 2 liter separable flask equipped with an inlet for nitrogen gas, a thermometer, a Dimroth condenser and a dropping funnel, 119 g (0.5 moles) of 3-mercaptopropyltriethoxysilane was placed. Under stirring, 151.2 g (0.45 moles) of an ethanol solution of sodium ethoxide containing 20% of the effective component was added. After the temperature was elevated to 80° C., the resultant solution was kept being stirred at 80° C. for 5 hours, then cooled and transferred to a dropping funnel.

Into another separable flask similar to the flask used above, 69.75 g (0.45 moles) of 1,6-dichlorohexane was placed. After the temperature was elevated to 80° C., the reaction product of 3-mercaptopropyltriethoxysilane and sodium ethoxide obtained above was slowly added dropwise. After the addition was completed, the resultant solution was kept being stirred at 80° C. for 5 hours. The resultant mixture was cooled, and salts in the obtained solution was removed by filtration. Ethanol and 1,6-dichlorohexane in an excess amount were removed by distillation under a reduced pressure. The obtained solution was distilled under a reduced pressure, and 137.7 g of a colorless transparent liquid having a boiling point of 148 to 150° C./0.005 Torr was obtained. In accordance with the IR analysis, the $^1$H-NMR analysis and the mass spectroscopy (MS analysis), it was found that the product was the compound expressed by $(CH_3CH_2O)_3Si$—$(CH_2)_3$—S—$(CH_2)_6$—Cl. The purity of the compound obtained in accordance with the gel permeation chromatography was 97.7%.

Into another 0.5 liter separable flask similar to the flask used above, 80 g of ethanol, 5.46 g (0.07 moles) of anhydrous sodium sulfide and 2.24 g (0.07 moles) of sulfur were placed, and the temperature was elevated to 80° C. While the resultant solution was stirred, 49.91 g (0.14 moles) of $(CH_3CH_2O)_3Si$—$(CH_2)_3$—S—$(CH_2)_6$—Cl obtained above was slowly added dropwise. After the addition was completed, the stirring was continued at 80° C. for 10 hours. After the stirring was completed and the resultant product was cooled, the formed salts were removed by filtration, and ethanol used as the solvent was removed by distillation under a reduced pressure.

The obtained reddish brown transparent solution was analyzed in accordance with the IR analysis, the $^1$H-NMR analysis and the supercritical chromatography, and it was confirmed that the product was a compound expressed by an average structural formula $(CH_3CH_2O)_3Si$—$(CH_2)_3$—S—$(CH_2)_6$—$S_2$—$(CH_2)_6$—S—$(CH_2)_3$—$Si(OCH_2CH_3)_3$. This compound is the compound expressed by average structural formula (I) in which $R^1$ represents ethyl group, $R^3$ represents n-propyl group, $R^4$ represents $(CH_2)_6$—$S_2$—$(CH_2)_6$ (which is the group represented by general formula (III) in which $R^6$ represents $(CH_2)_6$ and x represents 2), p represents 0, and m represents 1. The purity of the compound obtained in accordance with the GPC analysis was 85.7%.

SYNTHESIS EXAMPLE 6

The synthesis was conducted in accordance with the same procedures as those conducted in Synthesis Example 5 except that the amount of sulfur was changed to 4.48 g (0.14 moles).

The obtained solution was analyzed in accordance with the IR analysis, the $^1$H-NMR analysis and the supercritical chromatography, and it was confirmed that the product was a compound expressed by an average structural formula $(CH_3CH_2O)_3Si$—$(CH_2)_3$—S—$(CH_2)_6$—$S_3$—$(CH_2)_6$—S—$(CH_2)_3$—$Si(OCH_2CH_3)_3$. This compound is the compound expressed by average structural formula (I) in which $R^1$ represents ethyl group, $R^3$ represents n-propyl group, $R^4$ represents $(CH_2)_6$—$S_3$—$(CH_2)_6$ (which is the group represented by general formula (III) in which $R^6$ represents $(CH_2)_6$ and x represents 3), p represents 0, and m represents 1. The purity of the compound obtained in accordance with the GPC analysis was 84.9%.

SYNTHESIS EXAMPLE 7

The synthesis was conducted in accordance with the same procedures as those conducted in Synthesis Example 5 except that the amount of sulfur was changed to 6.72 g (0.21 moles).

The obtained solution was analyzed in accordance with the IR analysis, the $^1$H-NMR analysis and the supercritical chromatography, and it was confirmed that the product was a compound expressed by an average structural formula $(CH_3CH_2O)_3Si$—$(CH_2)_3$—S—$(CH_2)_6$—$S_4$—$(CH_2)_6$—S—$(CH_2)_3$—$Si(OCH_2CH_3)_3$. This compound is the compound expressed by average structural formula (I) in which $R^1$ represents ethyl group, $R^3$ represents n-propyl group, $R^4$ represents $(CH_2)_6$—$S_4$—$(CH_2)_6$ (which is the group represented by general formula (III) in which $R^6$ represents $(CH_2)_6$ and x represents 4), p represents 0, and m represents 1. The purity of the compound obtained in accordance with the GPC analysis was 81.0%.

SYNTHESIS EXAMPLE 8

The synthesis was conducted in accordance with the same procedures as those conducted in Synthesis Example 5 except that 94.95 g (0.45 moles) of 1,10-dichlorodecane was used in place of 1,6-dichlorohexane used in Synthesis Example 5, and a compound expressed by $(CH_3CH_2O)_3Si—(CH_2)_3—S—(CH_2)_{10}—Cl$ was obtained.

The synthesis was further conducted in accordance with the same procedures as those conducted in Synthesis Example 5 except that 57.75 g (0.14 moles) of the above compound expressed by $(CH_3CH_2O)_3Si—(CH_2)_3—S—(CH_2)_{10}—Cl$ was used in place of the compound expressed by $(CH_3CH_2O)_3Si—(CH_2)_3—S—(CH_2)_6—Cl$ which was used in Synthesis Example 5.

The obtained reddish brown transparent solution was analyzed in accordance with the IR analysis, the $^1$H-NMR analysis and the supercritical chromatography, and it was confirmed that the product was a compound expressed by an average structural formula $(CH_3CH_2O)_3Si—(CH_2)_3—S—(CH_2)_{10}—S_2—(CH_2)_{10}—S—(CH_2)_3—Si(OCH_2CH_3)_3$. This compound is the compound expressed by average structural formula (I) in which $R^1$ represents ethyl group, $R^3$ represents n-propyl group, $R^4$ represents $(CH_2)_{10}—S_2—(CH_2)_{10}$ (which is the group represented by general formula (III) in which $R^6$ represents $(CH_2)_{10}$ and x represents 2), p represents 0, and m represents 1. The purity of the compound obtained in accordance with the GPC analysis was 82.9%.

SYNTHESIS EXAMPLE 9

The synthesis was conducted in accordance with the same procedures as those conducted in Synthesis Example 1 except that 16.33 g (0.21 moles) of anhydrous sodium sulfide, 20.16 g (0.63 moles) of sulfur and 21.70 g (0.14 moles) of 1,6-dichlorohexane were used.

The obtained reddish brown transparent solution was analyzed in accordance with the IR analysis, the $^1$H-NMR analysis and the supercritical chromatography, and it was confirmed that the product contained a compound expressed by an average structural formula $(CH_3CH_2O)_3Si—(CH_2)_3—S_4—(CH_2)_6—S_4—(CH_2)_6—S_4—(CH_2)_3—Si(OCH_2CH_3)_3$ as the main component. This compound is the compound expressed by average structural formula (I) in which $R^1$ represents ethyl group, $R^3$ represents n-propyl group, $R^4$ represents $(CH_2)_6—S_4—(CH_2)_6$ (which is the group represented by general formula (III) in which $R^6$ represents $(CH_2)_6$, and x represents 4), p represents 0, and m represents 4. The purity of the compound obtained in accordance with the GPC analysis was 54.0%. No procedures were conducted for purification.

SYNTHESIS EXAMPLE 10

Into a 0.5 liter separable flask equipped with an inlet for nitrogen gas, a thermometer, a Dimroth condenser and a dropping funnel, 80 g of ethanol, 5.46 g (0.07 moles) of anhydrous sodium sulfide and 2.24 g (0.07 moles) of sulfur were placed, and the temperature of the resultant solution was elevated to 80° C. While the solution was stirred, 54.39 g (0.14 moles) of a compound expressed by an average structural formula: $((CH_3CH_2O)_3Si—(CH_2)_3—S_2—(CH_2)_6—Cl)$ was slowly added dropwise. After the addition was completed, the stirring was continued at 80° C. for 10 hours. After the stirring was completed, the formed salt was removed by filtration. Ethanol used as the solvent was removed by distillation under a reduced pressured, and 50.8 g of a reddish brown transparent liquid was obtained. The obtained product was analyzed in accordance with the IR analysis, the $^1$H-NMR analysis and the supercritical chromatography, and it was confirmed that the product was a compound expressed by an average structural formula $(CH_3CH_2O)_3Si—(CH_2)_3—S_2—(CH_2)_6—S_2—(CH_2)_6—S_2—(CH_2)_3—Si(OCH_2CH_3)_3$. This compound is the compound expressed by average structural formula (I) in which $R^1$ represents ethyl group, $R^3$ represents n-propyl group, $R^4$ represents $(CH_2)_6—S_2—(CH_2)_6$ (which is the group represented by general formula (III) in which $R^6$ represents $(CH_2)_6$, and x represents 2), p represents 0, and m represents 2. The purity of the compound obtained in accordance with the gel permeation chromatography (GPC analysis) was 86.9%.

SYNTHESIS EXAMPLE 11

The synthesis was conducted in accordance with the same procedures as those conducted in Synthesis Example 10 except that 10.92 g (0.14 moles) of anhydrous sodium sulfide, 4.48 g (0.14 moles) of sulfur and a mixed solution of 49.91 g (0.14 moles) of a compound expressed by $(CH_3CH_2O)_3Si—(CH_2)_3—S—(CH_2)_6—Cl$ and 10.85 g (0.07 moles) of 1,6-dichlorohexane was used in place of the compound expressed by $(CH_3CH_2O)_3Si—(CH_2)_3—S_2—(CH_2)_6—Cl$ which was used in Synthesis Example 10, and 55.1 g of a brown transparent solution was obtained. The obtained reddish brown solution was analyzed in accordance with the IR analysis, the $^1$H-NMR analysis and the supercritical chromatography, and it was confirmed that the product was a compound expressed by an average structural formula $(CH_3CH_2O)_3Si—(CH_2)_3—S—(CH_2)_6—S_2—(CH_2)_6—S_2—(CH_2)_6—S—(CH_2)_3—Si(OCH_2CH_3)_3$. This compound is the compound expressed by average structural formula (I) in which $R^1$ represents ethyl group, $R^3$ represents n-propyl group, $R^4$ represents $(CH_2)_6—S_2—(CH_2)_6—S_2—(CH_2)_6$ (which is the group represented by general formula (IV) in which $R^8$, $R^9$ and $R^6$ each represent $(CH_2)_6$, y represents 2, and z represents 2), p represents 0, and m represents 1. The purity of the compound obtained in accordance with the GPC analysis was 85.5%.

EXAMPLE 1

A diene-based rubber (manufactured by JSR Co., Ltd.; "#1712") in an amount of 110 parts by mass and 20 parts by mass of natural rubber were masticated for 30 seconds by a 1.8 liter Banbury mixer under a condition of 70 rpm and a starting temperature of 80° C. To the resultant mixture, 20 parts by mass of carbon black of the ISAF grade (manufactured by TOKAI CARBON Co., Ltd.; "SIEST 7HM"), 50 parts by mass of silica (manufactured by NIPPON SILICA KOGYO Co., Ltd.; "NIPSIL AQ"), 1 part by mass of stearic acid, 1.0 part by mass of an antioxidant 6PPD (N-phenyl-N'-(1,3-dimethylbutyl)-p-phenylenediamine) and 6.3 phr (part by mass per 100 parts by mass of the rubber component) of the compound synthesized in Synthesis Example 1 were mixed. After the mixing was continued until the temperature reached 160° C., the mixture was discharged and made into a sheet by rolls. The obtained mixture was remilled for 1 minute and 30 seconds by a 1.8 liter Banbury mixer under a condition of 70 rpm and a starting temperature of 80° C. Then, the mixture was discharged and made into a sheet by rolls. After the obtained mixture was sufficiently cooled to the room temperature, 3 parts by mass of zinc oxide, 0.5 parts by mass of vulcanization accelerator DM (dibenzothiazyl disulfide), 1.0 part by mass of vulcanization accelerator NS (N-t-butyl-2-benzothiazylsulfenamide) and 1.5 parts by weight of sulfur were mixed. The resultant mixture was mixed for 1 minute under a condition of 60 rpm and a starting temperature of 80° C., and a rubber composition was obtained. The results of the evaluations are shown in Table 1.

EXAMPLES 2 TO 9

Rubber compositions were obtained in accordance with the same procedures as those conducted in Example 1 except that compounds shown in Table 1 in amounts also shown in Table 1 were used in place of the compound synthesized in Synthesis Example 1. The results of the evaluations are shown in Table 1.

COMPARATIVE EXAMPLE 1

A rubber composition was obtained in accordance with the same procedures as those conducted in Example 1 except that 5.5 phr of a commercial coupling agent (manufactured by DEGUSSA Company; "Si69") (the structural formula: $(CH_3CH_2)O_3Si—(CH_2)_3—S_4—(CH_2)_3—Si(OCH_2CH_3)_3)$ was used in place of the compound synthesized in Synthesis Example 1. The results of the evaluations are shown in Table 1.

COMPARATIVE EXAMPLE 2

A rubber composition was obtained in accordance with the same procedures as those conducted in Example 1 except that 5.0 phr of a commercial coupling agent (manufactured by DEGUSSA Company; "Si75") (the structural formula: $(C_2H_5O)_3SiCH_2CH_2CH_2—S_2—CH_2CH_2CH_2Si(OC_2H_5)_3)$ was used in place of the compound synthesized in Synthesis Example 1. The results of the evaluations are shown in Table 1.

COMPARATIVE EXAMPLES 3 AND 4

Rubber compositions were obtained in accordance with the same procedures as those conducted in Example 1 except that compounds shown in Table 1 in amounts also shown in Table 1 were used in place of the compound synthesized in Synthesis Example 1. The results of the evaluations are shown in Table 1.

As clearly shown in Table 1, the compositions of Examples exhibited smaller Mooney viscosities, greater resilience and more excellent abrasion resistance, and the physical properties were more excellently balanced than those of compositions of Comparative Examples.

EXAMPLE 10

A tire was prepared in accordance with the conventional process using the rubber composition of Example 3 for the tread. The size of the tire was 205/65R15, and the size of the rim was 15×6JJ. The inner pressure was adjusted at 220 kPa. The tests of rolling resistance and abrasion resistance of the tire were conducted using the prepared tire. The results are shown in Table 2.

EXAMPLE 11

A tire was prepared and evaluated in accordance with the same procedures as those conducted in Example 10 except that the amount of the silane compound having sulfur atom in the rubber composition of Example 3 was changed to 5.0 phr. The results are shown in Table 2.

EXAMPLE 12

A tire was prepared and evaluated in accordance with the same procedures as those conducted in Example 10 except that the rubber composition of Example 9 was used. The results are shown in Table 2.

COMPARATIVE EXAMPLE 5

A tire was prepared and evaluated in accordance with the same procedures as those conducted in Example 10 except that the rubber composition of Comparative Example 2 was used. The results are shown in Table 2.

TABLE 1

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Silane compound having sulfur atom* | SE1 | SE2 | SE3 | SE4 | SE5 | SE6 | SE8 | SE10 | SE11 | Si69 | Si75 | SE7 | SE9 |
| purity (%) | 82.5 | 84.2 | 81.0 | 80.5 | 85.7 | 84.9 | 82.9 | 86.9 | 85.5 | — | — | 81.0 | 54.0 |
| amount (phr) | 6.3 | 6.6 | 7.0 | 7.5 | 7.2 | 7.5 | 8.2 | 8.5 | 9.3 | 5.5 | 5.0 | 8.3 | 10.3 |
| Mooney viscosity ($ML_{1+4}$) | 90 | 87 | 100 | 109 | 104 | 105 | 102 | 100 | 95 | 115 | 100 | 111 | 118 |
| Mooney scorch time | 101 | 100 | 90 | 60 | 95 | 94 | 98 | 99 | 98 | 62 | 100 | 71 | 64 |
| Hardness | 103 | 100 | 104 | 104 | 104 | 108 | 101 | 102 | 103 | 104 | 100 | 110 | 105 |
| Properties at break | | | | | | | | | | | | | |
| elongation at break (Eb) | 97 | 106 | 93 | 75 | 95 | 88 | 105 | 92 | 94 | 77 | 100 | 72 | 72 |
| strength at break (Tb) | 96 | 108 | 98 | 87 | 98 | 98 | 103 | 104 | 106 | 95 | 100 | 85 | 81 |
| tensile stress at 300% elongation | 104 | 101 | 110 | 128 | 105 | 120 | 101 | 116 | 118 | 115 | 100 | 131 | 125 |
| Resilience | 106 | 107 | 107 | 115 | 112 | 112 | 110 | 115 | 120 | 120 | 100 | 115 | 112 |
| Abrasion resistance (rubber composition) | 100 | 103 | 100 | 87 | 109 | 109 | 108 | 109 | 112 | 70 | 100 | 75 | 61 |

*SE: The compound of Synthesis Example

TABLE 2

|  | Example 10 | Example 11 | Comparative Example 5 | Example 12 |
|---|---|---|---|---|
| Rubber composition | rubber composition of Example 3 | rubber composition of Example 3 (modified) | rubber composition of Comparative Example 2 | rubber composition of Example 9 |
| Silane compound having sulfur atom* | SE3 | SE3 | Si75 | SE11 |
| purity (%) | 81.0 | 81.0 | — | 85.5 |
| amount (phr) | 7.0 | 5.0 | 5.0 | 9.3 |
| Rolling resistance (index) | 106 | 105 | 100 | 108 |
| Abrasion resistance (tire) | 102 | 101 | 100 | 106 |

*SE: The compound of Synthesis Example

As clearly shown in Table 2, the tires of Examples exhibited more excellent rolling resistance and abrasion resistance than those of the tire of Comparative Example.

Industrial Applicability

The rubber composition of the present invention has a small viscosity in the unvulcanized condition and provides excellent dispersion of silica. When this composition is used for the tread member of a tire, a tire exhibiting excellent abrasion resistance, a small rolling resistance and improved braking property and steering stability on wet roads can be obtained.

The invention claimed is:

1. A rubber composition which comprises, per 100 parts by mass of a polymer, 10 to 200 parts by mass of silica and 1 to 30 parts by mass of a silane compound having sulfur atom represented by average structural formula (I):

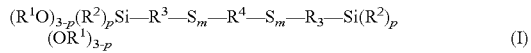

(I)

wherein $R^1$ and $R^2$ each represent a hydrocarbon group having 1 to 4 carbon atoms, $R^3$ represents a divalent hydrocarbon group having 1 to 15 carbon atoms, p represents an integer of 0 to 2, m represents a number of 1 or greater and smaller than 2, which may be an average of numbers, and $R^4$ represents a divalent functional group represented by one of following general formulae (III) to (IV):

 (III)

 (IV)

wherein $R^6$ to $R^7$ represents a linear divalent hydrocarbon group having 1 to 20 carbon atoms, $R^8$ to $R^{10}$ represents a linear divalent hydrocarbon group having 1 to 20 carbon atoms, $R^6$ to $R^{10}$ may represent a same group or different groups, and x, y and z each represent a number of 2 or greater and smaller than 4, which may be an average of numbers.

2. A rubber composition according to claim 1, wherein m represents 1 in average structural formula (I) representing the silane compound having sulfur atom.

3. A rubber composition according to claim 1, wherein x, y and z each represent a number of 2 or greater and 3 or smaller, which may be an average of numbers, in general formulae (III) and (IV) representing the divalent functional group.

4. A rubber composition according to claim 1, wherein $R^4$ represents a divalent functional group represented by general formula (IV) in average structural formula (I) representing the silane compound having sulfur atom.

5. A rubber composition according to claim 1, wherein, in average structural formula (I) representing the silane compound having sulfur atom, $R^4$ represents a divalent functional group represented by general formula (IV) in which $R^8$, $R^9$ and $R^{10}$ each represent hexylene group.

6. A rubber composition according to claim 1, wherein a purity of the silane compound having sulfur atom is 60% or greater at a time when the silane compound having sulfur atom is mixed to form the rubber composition.

7. A rubber composition according to claim 1, wherein, at a time when the silane compound having sulfur atom is mixed to form the rubber composition, a content of silane compounds having sulfur atom and three or more silicon atoms in one molecule is 30% by mass or smaller of the rubber composition.

8. A rubber composition according to claim 1, wherein a BET surface area of the silica is 40 to 350 m$^2$/g.

9. A rubber composition according to claim 1, wherein the polymer is a diene-based rubber.

10. A tire which comprises a member comprising a rubber composition described in claim 1.

11. A tire according to claim 10, wherein the member is a tire tread.

12. A rubber composition according to claim 2, wherein, at a time when the silane compound having sulfur atom is mixed to form the rubber composition, a content of silane compounds having sulfur atom and three or more silicon atoms in one molecule is 30% by mass or smaller of the rubber composition.

13. A rubber composition which comprises, per 100 parts by mass of a polymer, 10 to 200 parts by mass of silica and 1 to 30 parts by mass of a silane compound having sulfur atom represented by average structural formula (I):

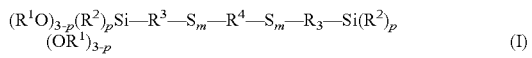

(I)

wherein $R^1$ and $R^2$ each represent a hydrocarbon group having 1 to 4 carbon atoms, $R^3$ represents a divalent hydrocarbon group having 1 to 15 carbon atoms, p represents an integer of 0 to 2, m represents a number of 1 or greater and smaller than 2, which may be an average of numbers, and $R^4$ represents a divalent functional group represented by the following general formula (II):

 (II)

wherein $R^5$ represents a decylene group, $R^5$ may represent a same group or different groups, and x, y and z each represent a number of 1 or greater and smaller than 4, which may be an average of numbers.

14. A rubber composition according to claim 13, wherein m represents 1 in average structural formula (I) representing the silane compound having sulfur atom.

15. A rubber composition according to claim 13, wherein a purity of the silane compound having sulfur atom is 60% or greater at a time when the silane compound having sulfur atom is mixed to form the rubber composition.

16. A rubber composition according to claim 13, wherein, at a time when the silane compound having sulfur atom is mixed to form the rubber composition, a content of silane compounds having sulfur atom and three or more silicon atoms in one molecule is 30% by mass or smaller of the rubber composition.

17. A rubber composition according to claim 13, wherein a BET surface area of the silica is 40 to 350 m²/g.

18. A rubber composition according to claim 13, wherein the polymer is a diene-based rubber.

19. A tire which comprises a member comprising a rubber composition described in claim 13.

20. A tire according to claim 19, wherein the member is a tire tread.

21. A rubber composition according to claim 14, wherein, at a time when the silane compound having sulfur atom is mixed to form the rubber composition, a content of silane compounds having sulfur atom and three or more silicon atoms in one molecule is 30% by mass or smaller of the rubber composition.

* * * * *